US009817258B2

(12) United States Patent
Zhou

(10) Patent No.: US 9,817,258 B2
(45) Date of Patent: Nov. 14, 2017

(54) BACKLIGHT MODULE AND LIQUID CRYSTAL DISPLAY DEVICE

(71) Applicant: Shenzhen China Star Optoelectronics Technology Co., Ltd., Shenzhen, Guangdong (CN)

(72) Inventor: Gege Zhou, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 271 days.

(21) Appl. No.: 14/386,922

(22) PCT Filed: Aug. 27, 2014

(86) PCT No.: PCT/CN2014/085271
§ 371 (c)(1),
(2) Date: Sep. 22, 2014

(87) PCT Pub. No.: WO2016/026160
PCT Pub. Date: Feb. 25, 2016

(65) Prior Publication Data
US 2016/0054515 A1  Feb. 25, 2016

(30) Foreign Application Priority Data
Aug. 19, 2014 (CN) .......................... 2014 1 0413407

(51) Int. Cl.
G02F 1/1333 (2006.01)
F21V 8/00 (2006.01)
G02F 1/1335 (2006.01)

(52) U.S. Cl.
CPC ...... G02F 1/133308 (2013.01); G02B 6/0088 (2013.01); G02F 1/133608 (2013.01); G02F 1/1336 (2013.01); G02F 1/133385 (2013.01); G02F 1/133615 (2013.01); G02F 2001/133317 (2013.01)

(58) Field of Classification Search
CPC ......... G02F 1/133308; G02F 1/133608; G02B 6/0088
See application file for complete search history.

(56) References Cited

U.S. PATENT DOCUMENTS 7,113,237 B2 * 9/2006 Nitto ................. G02F 1/133308
349/58

* cited by examiner

Primary Examiner — Dung Nguyen
(74) Attorney, Agent, or Firm — Andrew C. Cheng

(57) ABSTRACT

The present invention discloses a backlight module, comprising a plastic frame, a back frame and a positioning block, where the positioning block is fixed on the outer surface of the sidewall of the back frame, the supporting portion of the plastic frame is disposed on the back frame, the first positioning hole corresponding to the positioning block is disposed on the sidewall of the plastic frame, and the positioning block is embedded into the first position hole to fix the plastic frame and the back frame together. The present invention also discloses a liquid crystal display device having the backlight module. The backlight module and the liquid crystal display device of the present invention achieve the narrow boarder design, also own good positioning for the plastic frame and the outer frame, and even enhance the whole cooling performance of the backlight module.

16 Claims, 1 Drawing Sheet

BACKLIGHT MODULE AND LIQUID CRYSTAL DISPLAY DEVICE

FIELD OF THE INVENTION

The present invention relates to the liquid crystal display technology field, and in particular, relates to a backlight module and a liquid crystal display device.

BACKGROUND OF THE INVENTION

With the evolution of optoelectronics and semiconductor technology, it also brings the vigorous development of the flat panel display industry. In such many flat panel display, the liquid crystal display becomes the main product of the display market because it owns many superior characteristics of high space utilization efficiency, low power consumption, no radiation and low electromagnetic interference.

The liquid crystal display device usually comprises a liquid crystal panel and a backlight module. Because the liquid crystal display cannot illuminate by itself, the backlight module is assembled under the liquid crystal panel to provide the liquid crystal panel with the surface light source. Hence, the liquid crystal panel can display images via the surface light source from the backlight module.

In the prior art, the backlight module mainly comprises a plastic frame, optical films, light source, a light guide and a back plate. The light guide which one of its incident planes receives the light from the light source is installed on the back plate, and the light guide turns the light into the surface light source. The optical films installed on the light guide homogenize the surface light source and enhance the brightness of the surface light source. The plastic frame and the back plane are set together to fix the light guide, the light source and the optical films between the plastic frame and the back plate.

In recent years, the liquid crystal display device requires the more and more narrow frame, and the frame of the backlight module also meets the same requirement correspondingly. For the purpose of achieving the narrow boarder design of the backlight module, one mean is that the back plate is eliminated but it will greatly reduce the mechanical strength of the whole backlight module. Another mean is that the plastic frame is designed to be narrower but it only has the smaller degree of the narrow boarder design of the backlight module. Another mean is that the width of the sidewall of the back plate is reduced to achieve the narrow boarder design but it influences the cooling performance of the backlight module. The other mean is that the light source is designed on the sidewall of the back plate so as to achieve the narrow boarder design, and enhance the whole cooling performance of the backlight module; however, the plastic frame and the front frame (used for fixing the liquid crystal panel on the backlight module) cannot achieve the effective positioning.

SUMMARY OF THE INVENTION

In order to solve the problem in the prior art, the purpose of the present invention is to provide a backlight module comprising a plastic frame, a back frame, and a positioning block, which the positioning block is disposed on an outer surface of a sidewall of the back frame, and a supporting portion of the plastic frame is disposed on the back frame, and a first positioning hole corresponding to the positioning block is disposed on a sidewall of the plastic frame, and the positioning block is embedded into the first positioning hole to fix the plastic frame to the back frame.

Further, the backlight module further comprise a bump connected to a top portion of a side face of the positioning block, and an aperture corresponding to the bump is located on the supporting portion of the plastic frame and in opposition to the sidewall of the back frame, and the bump is disposed within the aperture and located on the sidewall of the back frame.

Further, the supporting portion of the plastic frame is configured to support a liquid crystal panel, which is fixed on the backlight module by fixing the backlight module to an outer frame, wherein the positioning block has a fixing hole, and a press part of the outer frame is laminated on the liquid crystal panel, and a second positioning hole corresponding to the fixing hole is located on a sidewall of the outer frame, and the outer frame, the plastic frame and the back frame are fixed together by positioning a fixing bolt into the fixing hole via the second positioning hole.

Further, the positioning block is fixed on the outer surface of the sidewall of the back frame by welding.

Further, the top surface of the positioning block is an incline plane.

Further, the bump and the positioning block are integrally formed.

Further, surrounding part of the second positioning hole is concave inward to keep the bolt head of the fixing bolt from protruding out of the outer surface of the sidewall of the outer frame.

Further, the fixing bolt is a screw, and the positioning hole is a screw hole.

Further, the back frame is made from metal.

The other purpose of the present invention is to provide a liquid crystal display device, which comprises the above mentioned backlight module.

The backlight module and the liquid crystal display device of the present invention achieve the narrow boarder design and the positioning of the plastic frame and the outer frame and enhance the cooling performance of the whole backlight module.

BRIEF DESCRIPTION OF THE DRAWINGS

Combining with the figures and the bellow detailed description, the characteristics and advantages of the embodiment of the present invention will be explained more clearly. The figures are.

DETAILED DESCRIPTION OF THE PREFERRED EMBODIMENTS

In the following paragraph, the embodiments of the present invention are described detail with reference to the figures. However, there can be various embodiments to achieve the present invention, rather than to limit the scope of the present invention. On the contrary, the embodiments were chosen and described in order to explain the principles of the disclosure and their practical application so as to activate others skilled in the art to utilize the disclosure and various embodiments and with various modifications as are suited to the particular use contemplated.

In the figures, the same mark represents the same element. It can be understood that these elements should not be limited even though they are described by using the terms "first" and "second". These terms are only used to distinguish one element from the other element.

Figure 1:
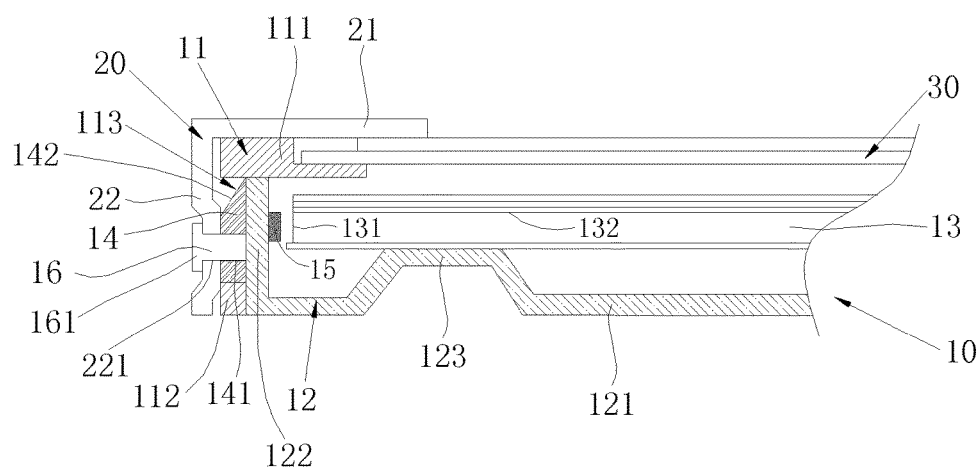
FIG. 1 is the lateral view of the liquid crystal display device according to one embodiment of the present invention.

FIG. 1 is a lateral view of the liquid crystal display device according to the embodiment of the present invention.

Please refer to FIG. 1. According to the present invention, the liquid crystal display device comprises a backlight module 10, an outer frame 20 and a liquid crystal panel 30. The liquid crystal panel 30 is installed on the backlight module 10, and the backlight module 10 provides the light for the liquid crystal panel 30 so that the liquid crystal display device 30 displays images. The outer frame 20 comprises a press part 21 and the sidewall 22 which is nearly vertical to the press part 21. Also, the press part 21 is laminated on the liquid crystal panel 30. The sidewall 22 of the outer frame 20 fixes and combines with the backlight module 10 so as to fix the liquid crystal panel 30 on the backlight module 10. It should be understood is that the liquid crystal panel still comprises other elements without describing because the elements are all known by the person in the art.

The backlight module 10 comprises a plastic frame 11, a back frame 12, a light guide plate 13 and a positioning block 14. The plastic frame 11 comprises a supporting portion 111 and a sidewall 112 which is nearly vertical to the supporting portion 111. The back frame 12 comprises a bottom plate 121 and a sidewall 122 which is nearly vertical to the bottom plate 121. In order to improve the cooling performance of the backlight module 10, the back frame 12 is made from the metal material with good thermal conductivity. In this embodiment, the back frame 12 is made from Al or aluminum alloy.

In the assembled state, the light guide plate 13 is installed on the bottom plate 121 so that the incident plane 131 of the light guide plate 13 is located correspondingly to the sidewall 122 of the back frame 12. The light source 15 is installed on the inner surface of the sidewall 122 of the back frame 12, where the light from the light source 15 enters into the light guide plate 13 through the incident plane 131, and then projects from the exiting plane 132 of the light guide 13 in order to have the good brightness to the liquid crystal panel 30. In the embodiment, the light source can be a light emitting diode which is disposed on the inner surface of the sidewall 122 of the outer frame 12. The driving circuit providing the power is usually installed on the inner surface of the sidewall 122 of the back frame 12. Therefore, the backlight module 10 not only has good cooling performance but also absolves the components used for assembling the light source 15, further to achieve the purpose of sharply narrow boarder design for the liquid crystal display device.

The bottom plate 121 of the back frame 12 has a bump 123. In the assemble state, the bump 123 contacts with the light guide plate 13 further to enhance the overall thermal performance of the backlight module 10. Otherwise, this kind of the back frame 12 has supporting function to the light guide plate 13 to own the mechanical properties of the backlight module 10.

The positioning block 14 is disposed on the outer surface 1222 of the sidewall 122 of the back frame 12. According to the embodiment, the positioning block 14 is disposed on the outer surface of the sidewall 122 of the back frame 12 by wielding, but the scope of the present invention is not limited thereto. The supporting portion 111 of plastic frame 11 is disposed on the back frame 12 to support the liquid crystal panel 30. The first positioning hole 113 corresponding to the positioning block 14 is disposed on the sidewall 112 of the plastic frame 11. The positioning block 14 is embedded into the first positioning hole 113 to fix the plastic frame 11 to the back frame 12 and achieve the positioning of the plastic frame 11.

In order to position the outer frame 20, the backlight module 10 still comprises a fixing bolt 16 which fixes the outer frame 20, the plastic frame 11 and the back frame 12 together, where the positioning block 14 has a fixing hole 141. The press part 21 of the outer frame 20 is laminated on the liquid crystal panel 30. The second positioning hole 221 corresponding to the fixing hole 141 is located on the sidewall 22 of the outer frame 20. The fixing bolt 16 is positioned into the fixing hole 141 via the second positioning hole 221 in order to combine the outer frame 20, the plastic frame 11 and the back frame 12 together. In the embodiment, the fixing bolt can be a screw, and the second positioning hole 221 can be a screw hole. However, the scope of the present invention is not only limited thereto.

Otherwise, the surrounding part of the second positioning hole 221 is concave inward (i.e. protruding to the sidewall 112 of the plastic frame 11) to keep the bolt head of the fixing bolt from protruding out of the outer surface of the sidewall of the outer frame. Hence, on the whole, the outer frame 20 is flat without any protrusion so as to enhance the aesthetic profile of the liquid crystal display device.

In order to engage the positioning block 14 of the outer surface of the sidewall 122 of the back frame 12 with the first position hole 113 during the assembly process, the top surface 142 of the positioning block 14 is formed to be an incline plane.

Figure 2:
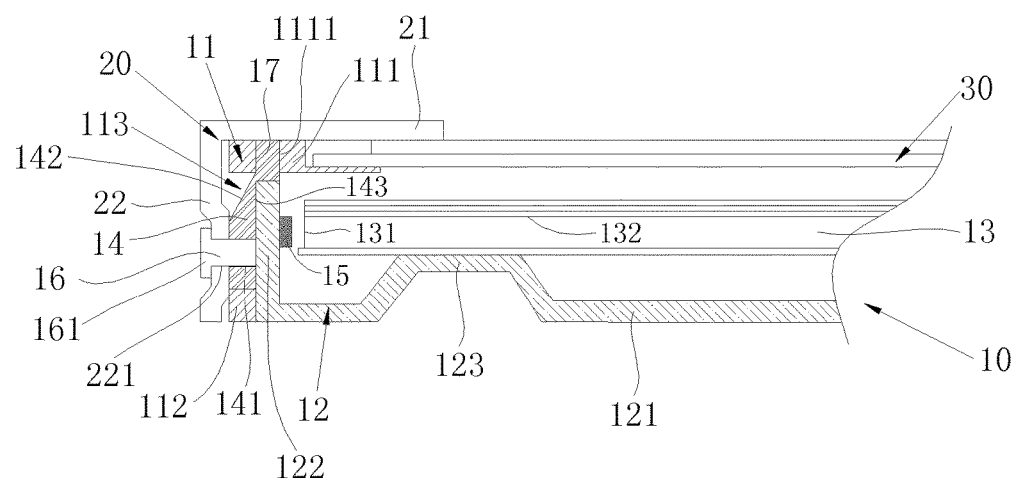
FIG. 2 is the lateral view of the liquid crystal display device of the other embodiment of the present invention.

FIG. 2 is a later view of the liquid crystal display device according to the other embodiment of the present invention.

In the other embodiment, the same description as the above mentioned embodiment is not repeated herein for short. Please refer to FIG. 2, comparing with the above mentioned embodiment, the difference between the two embodiments is that the backlight module 10 comprises a bump 17 which connects with the top portion of the side face 143 of the positioning block 14. According to the other embodiment, preferably, the bump 17 and the positioning block 14 are integrally formed, and the scope of the present invention is not only limited thereto.

An aperture 1111 corresponding to the bump 17 is located on the supporting portion 111 of the plastic frame 11 and in opposition to the sidewall 122 of the back frame 12, where the width of the aperture 1111 is generally equal to the width of the sidewall 122 of the back frame 12. In the assemble state, the bump 17 is disposed within the aperture 1111 and located on the sidewall 122 of the back frame 12. Because of this kind of the structure, the plastic frame 11 can be kept from rolling over at the incident side of the backlight module 10 of which the structure results in light leakage problem.

In summary, the liquid crystal display device according to the embodiments of the present invention achieves the narrow boarder design and the positioning of the plastic frame and the outer frame, and at the same time enhances the cooling performance of the overall backlight module.

The foregoing preferred embodiments of the present invention are illustrative, rather than limiting, of the present invention. It is intended that they cover various modifications, and similar arrangements be included within the spirit and scope of the appended claims, the scope of which should be accorded the broadest interpretation so as to encompass all such modifications and similar structures.

What is claimed is:

1. A backlight module comprising a plastic frame, a back frame, and a positioning block, wherein the positioning block is disposed on an outer surface of a sidewall of the back frame, and a supporting portion of the plastic frame is disposed on the back frame, and a first positioning hole corresponding to the positioning block is disposed on a sidewall of the plastic frame, and the positioning block is embedded into the first positioning hole to fix the plastic frame to the back frame;

wherein the backlight module further comprises a bump connected to a top portion of a side face of the positioning block, and an aperture corresponding to the bump is located on the supporting portion of the plastic frame and in opposition to the sidewall of the back frame, and the bump is disposed within the aperture and located on the sidewall of the back frame.

2. The backlight module as claimed in claim 1, wherein the supporting portion of the plastic frame is configured to support a liquid crystal panel, which is fixed on the backlight module by fixing the backlight module to an outer frame, wherein the positioning block has a fixing hole, and a press part of the outer frame is laminated on the liquid crystal panel, and a second positioning hole corresponding to the fixing hole is located on a sidewall of the outer frame, and the outer frame, the plastic frame and the back frame are fixed together by positioning a fixing bolt into the fixing hole via the second positioning hole.

3. The backlight module as claimed in claim 2, wherein surrounding part of the second positioning hole is concave inward to keep a bolt head of the fixing bolt from protruding out of the outer surface of the sidewall of the outer frame.

4. The backlight module as claimed in claim 2, wherein the fixing bolt is a screw, and the positioning hole is a screw hole.

5. The backlight module as claimed in claim 1, wherein the positioning block is fixed on the outer surface of the sidewall of the back frame by welding.

6. The backlight module as claimed in claim 1, wherein top surface of the positioning block is an incline plane.

7. The backlight module as claimed in claim 1, wherein the bump and the positioning block are integrally formed.

8. The backlight module as claimed in claim 1, wherein the back frame is made from metal.

9. A liquid crystal display device, comprising a backlight module and a liquid crystal panel, wherein the backlight module comprises a plastic frame, a back frame and a positioning block, the positioning block is disposed on an outer surface of a sidewall of the back frame, and a supporting portion of the plastic frame is disposed on the back frame, and a first positioning hole corresponding to the positioning block is disposed on a sidewall of the plastic frame, and the position block is embedded into the positioning hole to fix the plastic frame into the back frame;

wherein the backlight module further comprises a bump, wherein the bump connected to a top portion of a side face of the positioning block, and an aperture corresponding to the bump is disposed on the supporting portion of the plastic frame and in opposition to the sidewall of the back frame, and the bump is disposed within the aperture and located on the sidewall of the back frame.

10. The liquid crystal display device as claimed in claim 9, wherein the supporting portion of the plastic frame is configured to support the liquid crystal panel, which is fixed on the backlight module by fixing the backlight module to an outer frame, wherein the positioning block has a fixing hole, and a press part of the outer frame is laminated on the liquid crystal panel, and a second positioning hole corresponding to the fixing hole is located on a sidewall of outer frame, and the outer frame, the plastic frame and the back frame together are fixed together by positioning a fixing bolt into the fixing hole via the second positioning hole.

11. The liquid crystal display device as claimed in claim 10, wherein surrounding part of the second positioning hole is concave inward to keep a bolt head of the fixing bolt from protruding out of outer surface of the sidewall of the outer frame.

12. The liquid crystal display device as claimed in claim 10, wherein the fixing bolt is a screw, and the positioning hole is a screw hole.

13. The liquid crystal display device as claimed in claim 9, wherein the positioning block is fixed on the outer surface of the sidewall of the back frame by welding.

14. The liquid crystal display device as claimed in claim 9, wherein top surface of the positioning block is an incline plane.

15. The liquid crystal display device as claimed in claim 9, wherein the bump and the positioning block are integrally formed.

16. The liquid crystal display device as claimed in claim 9, wherein the back frame is made from metal.

* * * * *